United States Patent

Morris

[11] Patent Number: 5,248,184
[45] Date of Patent: Sep. 28, 1993

[54] SEAT BACK INERTIA LATCH AND SECTOR SYSTEM

[75] Inventor: Kirk E. Morris, Brentwood, England
[73] Assignee: ITT Corporation, New York, N.Y.
[21] Appl. No.: 805,231
[22] Filed: Dec. 11, 1991
[51] Int. Cl.⁵ .............................................. B60N 2/02
[52] U.S. Cl. ................................. 297/378.11; 297/362
[58] Field of Search .................................. 297/362, 379

[56] References Cited

U.S. PATENT DOCUMENTS

| | | |
|---|---|---|
| 4,295,682 | 10/1981 | Kluting et al. ............... 297/379 X |
| 4,304,386 | 12/1981 | Nagashima et al. . |
| 4,371,207 | 2/1983 | Wilking et al. . |
| 4,382,630 | 5/1983 | Weston ............................. 297/362 |
| 4,402,547 | 9/1983 | Weston et al. .................. 297/362 X |
| 4,469,375 | 9/1984 | Boyer . |
| 4,573,738 | 3/1986 | Heesch . |
| 4,630,866 | 12/1986 | McFarlane . |
| 4,666,210 | 5/1987 | Bianchi . |
| 4,696,515 | 9/1987 | Heesch . |
| 4,705,319 | 11/1987 | Bell .................................. 297/362 |
| 4,717,204 | 1/1988 | Tezuka . |
| 4,720,144 | 1/1988 | Heesch . |
| 4,733,912 | 3/1988 | Secord ........................... 297/362 X |
| 4,795,213 | 1/1989 | Bell ................................. 297/397 X |
| 4,929,024 | 5/1990 | Secord . |

*Primary Examiner*—Laurie K. Cranmer
*Attorney, Agent, or Firm*—Robert P. Seitter; J. Gordon Lewis

[57] ABSTRACT

A motor vehicle seat recliner (10) includes upper and lower attachment members (12 and 14) joined at a hinge point (16). An adjuster (58) operates to establish a substantially fixed angular position between the members. An inertia latch (60) operative to disengage the adjuster from the upper attachment member as a function of recliner attitude and acceleration includes elements (52 and 62) defining cooperating engagement surfaces (98 and 99) which are relatively displaceable upon incipient movement of one of the members in a predetermined direction from a pre-latched position to a release position when the movement is relatively slow and to an engaged position when the movement is relatively fast.

11 Claims, 5 Drawing Sheets

SEAT BACK INERTIA LATCH AND SECTOR SYSTEM

INTRODUCTION

The present invention relates to a seat recliner mechanism for a motor vehicle and, more particularly, to a seat recliner including an inertia release latch, and more particularly still to such a recliner which is actuated by an electric motor.

BACKGROUND OF THE INVENTION

Automotive seats usually comprise a seat bottom that is affixed to a seat frame. The seat frame is mounted to the floor of the vehicle and is usually of a rail-type design to allow the forward and rearward adjustment of the seat bottom. The seat back is attached to the seat bottom by a seat back support. If the seat is a reclining type seat where the seat back is rotationally movable with respect to the seat bottom, a locking and release mechanism must be provided. The seat reclining mechanism usually comprises a base that is affixed to the structure of the seat bottom. The seat back support is pivotally mounted to such base as it is desirable to have the seat back move forward and rearward with the seat bottom. The locking and release mechanism by which the seat back is held in a fixed angular position relative to the seat bottom has several known forms. One form is a ratchet mechanism wherein a notched wheel is fixed to either the seat back or seat bottom and a pawl is attached to the other. Upon the pawl disengaging the notched wheel, the seat back is released and is free to rotate at its pivot with respect to the seat bottom. Other types of engaging or intermeshing gear type mechanisms will provide a locking and a releasing operation between the seat bottom and seat back.

As a customer comfort and convenience feature, many motor vehicles are now equipped with automated seat reclining mechanisms which allow the seat occupants to recline the seat back to a desired position. For some motor vehicles, and particularly those for the luxury market, the recliner mechanism is electrically powered.

Although equally applicable to manual seat back adjusters, the present invention is particularly related to an improved power type reclining mechanism.

The use of inertia latches in motor vehicle seat back recliners is known, particularly in two-door type vehicles, to facilitate rear seat entry and egress. Such latches provide for free displacement of the front seat back from its set position to a forward position when the vehicle is stationary but, through use of an inertia member, cause the seat back to be momentarily locked in its set position during periods of high de-acceleration such as during emergency braking of the vehicle.

Such prior art inertia latch devices have been unsatisfactory in several respects. First, because they are typically in the release condition during normal operation, a malfunction may result in non-engagement during a vehicle impact without providing advance warning to the operator. Secondly, even with proper operation, prior art inertia devices require that the inertia member be rapidly displaced from the release position to the engaged position during incipient movement of the seat back under high de-acceleration conditions. This necessary displacement of the inertia member necessarily permits a given degree of lost motion movement of the seat back prior to engagement. Under certain conditions, it has been found that a front seat vehicle occupant's shoulder harness becomes taunt prior to engagement of the seat back inertia latch. This is highly undesirable inasmuch as an unrestrained rear seat object or passenger can impact the rear surface of the front seat back prior to engagement of the inertia latch, causing unacceptably high impact loading on the operator's chest region via his shoulder belt or harness.

BRIEF DESCRIPTION OF THE INVENTION

Accordingly, it is an object of the present invention to provide a vehicle seat recliner including an inertia latch controlling the seat back position which engages nearly instantaneously upon incipient movement of the seat back during high de-acceleration. Also, the present invention provides the art with a simple, inexpensive seat back recliner that overcomes the shortcoming of the prior art described hereinabove. In the broadest sense, the vehicle seat recliner includes upper and lower attachment members which are joined at a hinge point, an adjuster mechanism which is operable to selectively establish a substantially fixed angular position between the members, and a latch which is operative to disengage the adjuster mechanism from one or both of the attachment members as a function of recliner acceleration. The latch includes elements which define cooperating engagement surfaces which are relatively displaceable upon incipient movement of one of the members in a predetermined direction from a pre-latched position to a release position when the movement is relatively slow and to an engaged position when the movement is relatively fast. This arrangement provides the advantage of a simple, inexpensive design including an inertia latch which is at all times in a partial or pre-latched condition to minimize the amount of incipient pivotal movement of an associated seat back during high de-acceleration conditions to effect a full latch engagement.

In the preferred embodiment of the invention, the seat recliner includes a lower recliner structure for supporting the seat cushion, an upper recliner structure for supporting a seat back which is joined to the lower structure at a hinge point. An adjuster mechanism is carried by the lower recliner structure engages the upper recliner structure for selective substantially fixed angular positioning therebetween. A latch mechanism is operative to disengage the adjuster mechanism from the upper recliner structure as a function of recliner attitude and acceleration, the latch mechanism including elements defining first and second cooperating engagement surfaces which are relatively displaceable upon incipient movement of one of the members in a predetermined direction from a closely spaced pre-latched position to a widely spaced release position when the movement is at a relatively slow rate and to an abutting engaged position when the movement is at a relatively high rate. This arrangement provides the advantage of enabling the use of conventional adjuster mechanisms which are rigidly retained on the lower recliner structure along with the seat cushion for translatory forward and rearward movement with the entire seat assembly.

According to another aspect of the invention, the seat recliner also includes manual release member which is operable to displace the latch member elements to the release position independently of recliner attitude and acceleration. This arrangement has the advantage of overriding the operation of the inertia latch, particularly by a rear seat occupant.

According to another aspect of the invention, the latch elements comprise a sector member which is mounted to the lower recliner structure for limited rotation about an axis of the hinge point and a latch member carried by the upper recliner structure for limited rotation about a pivot axis which is offset and generally parallel to the hinge point axis. This arrangement has the advantage of providing for use of a relatively high strength adjuster mechanism which is infinitely adjustable through a relatively wide operating range.

According to still another aspect of the invention, the sector member defines an arcuate toothed portion and the adjuster mechanism comprises an operator controlled electric motor drivingly engaging the toothed portion through a high reduction drive train. This arrangement has the advantage of permitting use of an inexpensive low output motor which provides the high torque necessary to actuate the seat recliner.

These and other features and advantages of this invention will become apparent upon reading the following specification which, along with the drawings, describes and discloses a preferred embodiment of the invention in detail.

A detailed description of the disclosed embodiment makes reference to the accompanying drawings.

DETAILED DESCRIPTION OF THE PREFERRED EMBODIMENT

Referring to FIGS. 1 through 4, the present invention is embodied in a recliner mechanism shown generally at 10 comprising an upper recliner structure 12 and a lower recliner structure 14 which are attached for relative pivoting motion about a pivot pin 16. Lower recliner structure 14 is adapted for attachment to a seat cushion frame (not illustrated) which supports a seat cushion. Similarly, upper recliner structure 12 is adapted for attachment to a seat back frame (not illustrated) which supports a seat back cushion.

Recliner mechanism 10 is primarily intended for application in a seat assembly within a passenger motor vehicle, although it is contemplated that it could be employed in other applications. Furthermore, recliner mechanism 10 is described herein as a power seat recliner mechanism, it being understood that, in the broadest sense, the present invention could be employed in manual-type seat recliner mechanisms.

Upper recliner structure 12 is composed of spaced, generally parallel inner and outer recliner plates 18 and 20, respectively, maintained in their illustrated positions by spacers 22 and 24 defining through bores for receiving fastening hardware (not illustrated). Likewise, lower recliner structure 14 is composed of inner and outer recliner plates 26 and 28, respectively, which are spaced apart in a generally parallel relationship by spacers 30 and 32 defining through bores for receiving mounting hardware (not illustrated). The lower portion of upper recliner structure 12 is disposed between inner and outer recliner plates 26, 28 of the upper portion of lower recliner structure 14. Pivot pin 16 extends through registering apertures in plates 18, 20, 26 and 28 to define a main pivot axis. The various spacers described herein are held in assembly with recliner mechanism 10 such as by swedging, welding, suitable fasteners or the like. A pin 34 extends laterally in both directions through registering arcuate slots 36 and 38 formed in inner and outer recliner plates 26 and 28, respectively. The interaction of pin 34 and slots 36 and 38 limits the maximum range of angular motion of upper recliner structure 12 relative to lower recliner structure 14 for establishing a seat back reclined position sit point. Power seat recliner mechanism 10 as shown in the Figures is intended for use for front occupant seats of a two-door type vehicle in which the front seat back has a folding or "dumping" capability to provide access to a rear compartment or storage area. Typically one, but conceivably, two such mechanisms 10 would be employed for each seat.

Lower recliner structure 14 carries an electric drive motor 40 and elements associated with a gear reduction transmission. Electric motor 40 is an elongated type with its drive shaft 42 extending through one of its axial ends. In a preferred embodiment, drive shaft 42 would be of the type which is flexible and torsionally compliant to absorb shock loads acting on the drive system for the device. A series of gears having differing diameters of toothed gear surfaces are used to provide the necessary gear reduction. A worm gear 44 is affixed to drive shaft 42 for rotation therewith and is supported at its axial ends by bearings (not shown) within bearing housing 46 which is attached to lower recliner structure 14. A series of gears including first through fourth gears 48-51, respectively, are each driven first by their larger diameter tooth section and drive the adjacent gear through their smaller diameter gear section to provide a gear reduction in accordance with well known gearing principles. Fourth gear 51 meshes with an external toothed quadrant or sector gear 52. First gear 48 and the worm gear bearings are carried by housing 46 which is mounted to the outer recliner plate 28 of lower recliner structure 14 by screws or other suitable fasteners. First gear 48 is carried for rotation upon an axle 54 which is supported at one end by a passage way within inner recliner plate 26 and at the opposite end by a boss formed within housing 46. The larger diameter toothed section of first gear 48 meshes with worm gear 44. The small diameter toothed section of first gear 48 meshes with the large diameter toothed section of second gear 49 which is carried for rotation upon a second axle 56 which spans the distance between inner and outer recliner plates 26 and 28. The small diameter toothed section of second gear 49 is likewise meshed with the large diameter toothed section of third gear 50 which is carried for rotation upon axle 54. Lastly, the small diameter toothed section of third gear 50 is meshed with the large diameter toothed section of fourth gear 51 which is carried for rotation upon axle 56.

In operation, rotation of electric motor 40 causes drive gears 44, and 48 through 52 to rotate which ultimately drives upper recliner structure 12 to rotate about pivot pin 16, thereby causing changes in the reclined position setting. The rotational direction of electric motor 40 can be reversed to cause the seat reclined position to change in a opposite direction. Thus, motor 40 and its associated gear train constitute adjuster means, shown generally at 58, which are operable to selectively established a substantially fixed angular position between upper and lower recliner structures 12 and 14. The large collective gear reduction eliminates the need for a separate brake. Motor 40 is electrically in circuit with an operator or seat occupant actuated control circuit (not illustrated).

An inertia latch 60 is configured to disengage the adjuster means 58 from upper recliner structure 12 as a function of recliner attitude and acceleration. The inertia latch 60 is made up of sector gear 52 and an inertia or latch member 62. As will be described in greater detail herein below, the sector gear 52 and latch member 62 define cooperating engagement surfaces which are relatively displaceable upon incipient movement of upper recliner structure 12 in a predetermined position from a pre-latched position to a release position when the movement is relatively slow and to a full engaged position when the movement is relatively fast.

Sector gear 52 is mounted to lower recliner structure 14 for rotation about pivot pin 16. Pin 34 is carried by and extends laterally from sector gear 52 through arcuate slots 36 and 38 to establish the forward and rearward most range of adjustment effected by adjustment means 58. Upper recliner structure 12 is thus carried by lower recliner structure 14 through supporting pivot pin 16 and is free for limited rotation from a normal set position (illustrated in FIG. 1) established by stop means constituted by inertia latch 60 and a forward position displaced counterclockwise from the illustrated position in which a staked hexagonal stop 64 formed in inner recliner plate 18 of upper recliner structure 12 contacts a surface 65 of inner recliner plate 26 of lower recliner structure 14. Displacement of upper recliner structure 12 from its illustrated set position counter clockwise to its forward folding or "dumping" position is illustrated by arrow 66. The set position of upper recliner structure 12 is thus established by the angular position of sector gear 52 which, in turn, is set by adjuster means 58.

Latch member 62 is carried with upper recliner structure 12 for rotation about a second axis which is generally parallel to the axis of pivot pin 16 and is upwardly and rearwardly displaced therefrom. The axis of rotation of latch member 62 is fixed by a pin 68 laterally traversing inner and outer recliner plates 18 and 20 and fastened thereto such as by staking or welding or other suitable processes. The adjoining surface contours of latch member 62 and sector gear 52 self engage to provide the function of latch 60 as will be described in detail hereinbelow. In the latched condition, upper recliner structure 12 and sector gear 52 are rigidly interlinked and their rotation in unison about pivot pin 16 is controlled by adjuster means 58. When inertia latch 60 is in the release position, upper recliner structure 12 can be pivoted forward as indicated by arrow 66 independently of the position ff sector gear 52 through a range of approximately 55 degrees. A rearwardly directed emergency release lever 70 is provided to enable rear seat occupants to manually override the operation of inertia latch 60. Lever 70 is supported for rotation about a laterally extending pin 72 traversing inner and outer recliner plates 18 and 20, respectively. Lever 70 includes a handle 74 and a plunger 76 interconnected by a living hinge 78 all integrally formed of molded resilient material such as plastic. When manually actuated upwardly from its illustrated position, handle 74 causes plunger 76 to be displaced downwardly along a line of action which extends nearly through the axis of pin 68. The leading edge of plunger 76 contacts a sloped surface 80 formed on an edge of latch member 62 to effect a momentary counterclockwise rotational displacement from a pre-latched position to an unlatched position, thereby freeing upper recliner structure 12 for forward displacement. Upon release of handle 74, a spring (not shown) will return lever 72 to its illustrated position. Likewise, a separate tension spring (not shown) interconnecting upper and lower recliner structures 12 and 14, respectively, will tend to bias upper recliner structure 12 towards its set (illustrated) position.

Figures 1, 2:
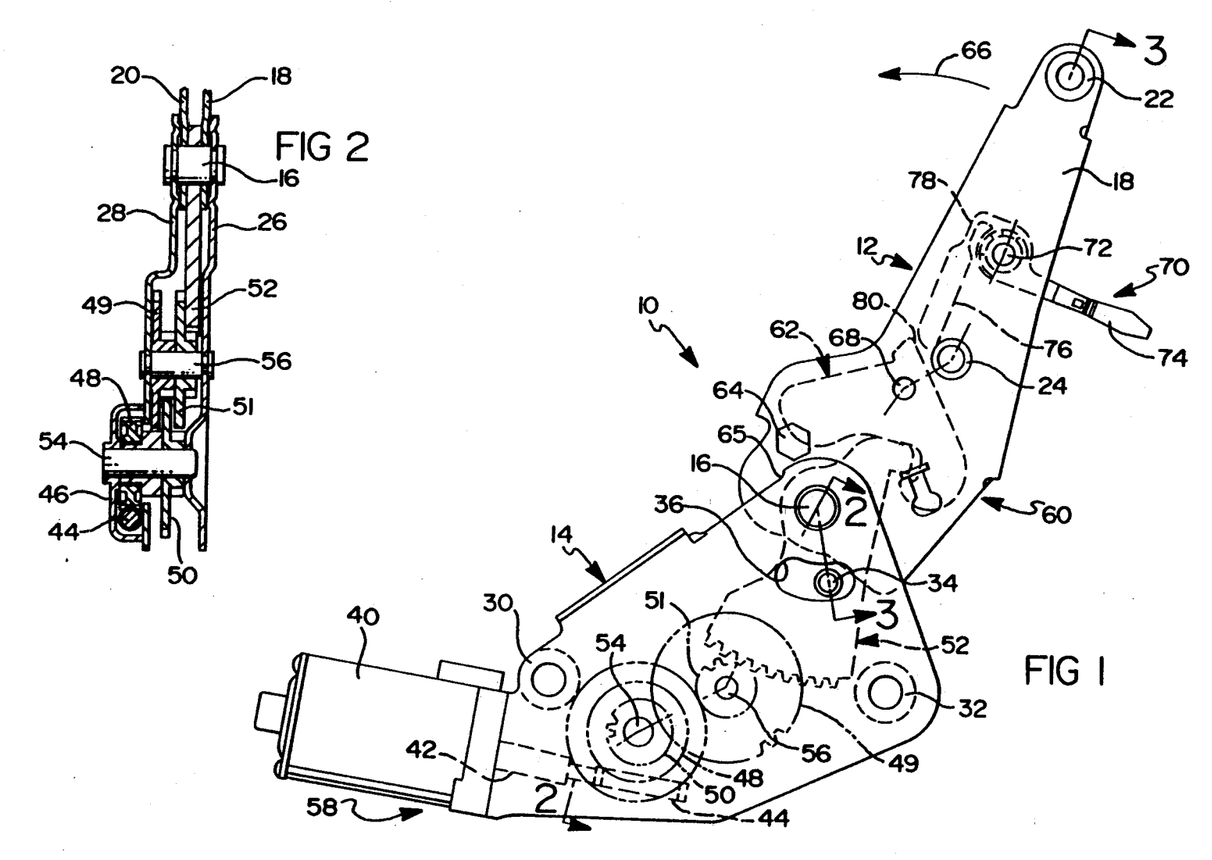
FIG. 1, is a side plan view of a vehicle seat recliner mechanism according to the present invention.
FIG. 2, is a cross-sectional view taken along line 2—2 of FIG. 1.
Figure 3:
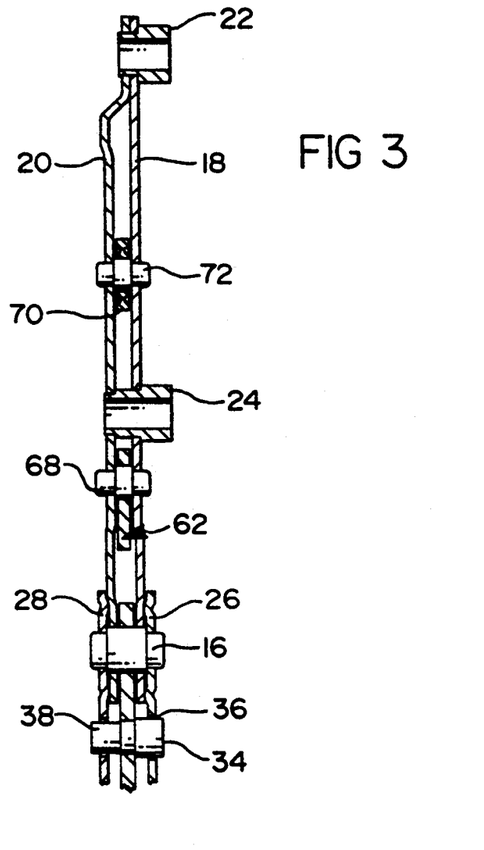
FIG. 3, is a cross-sectional view taken along line 3—3 of FIG. 1.
Figure 4:
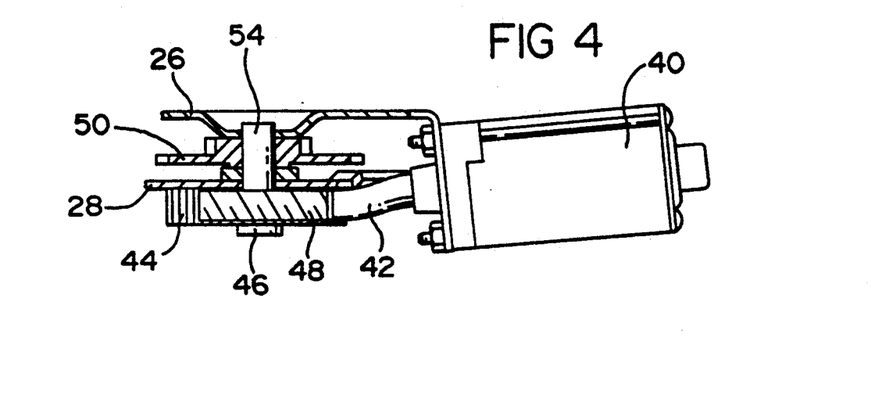
FIG. 4, is a top, partial cross-section, broken view of the vehicle seat recliner of FIG. 1.
Figures 5, 5A, 6:
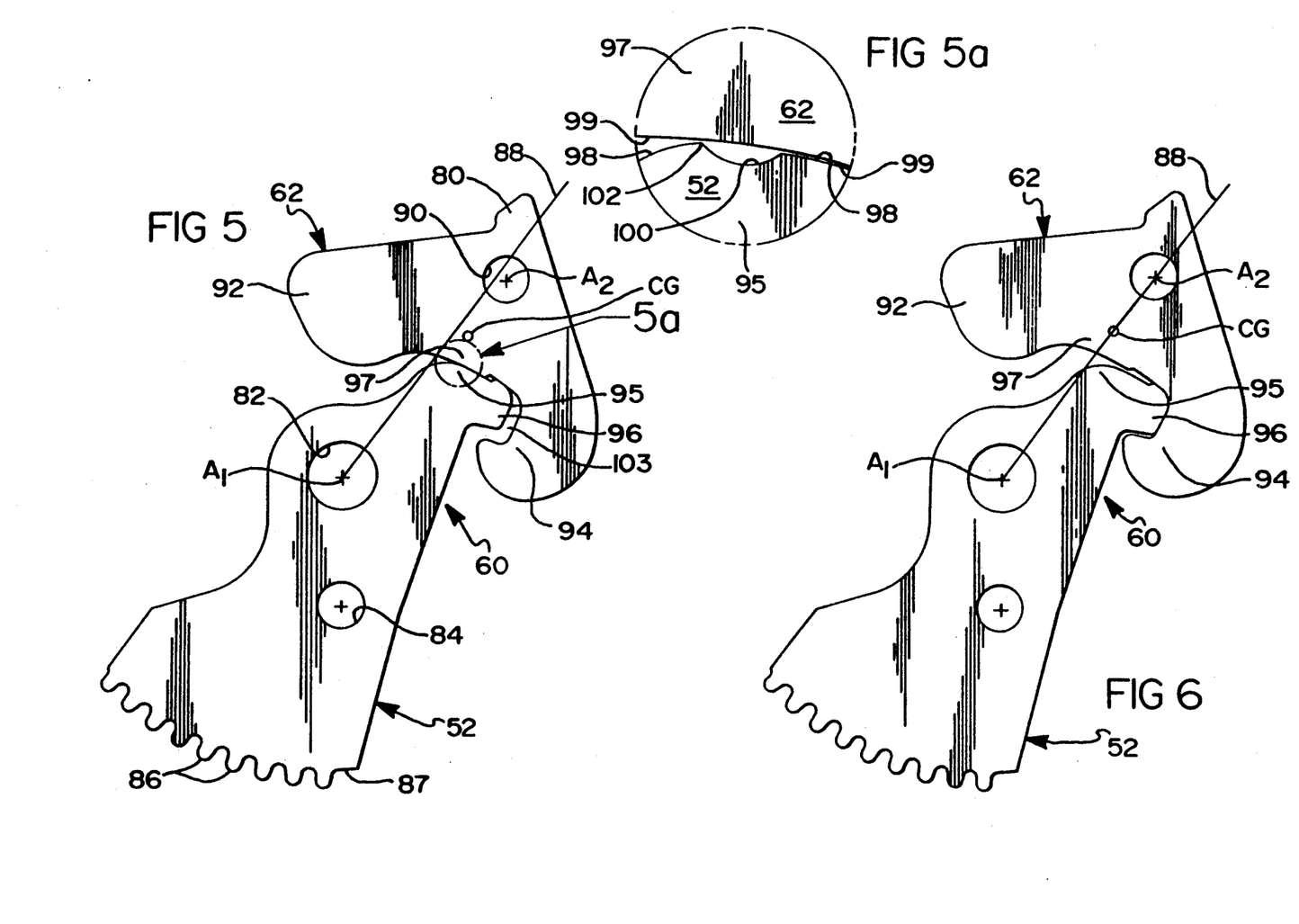
FIG. 5, is an enlarged view of the sector and inertia members in their respective pre-latched position from the vehicle seat recliner of FIG. 1.
FIG. 5a, is a greatly enlarged detail from FIG. 5.
FIG. 6, illustrates the sector and inertia members of FIG. 5, but in their abutting, fully engaged position.

Referring to FIGS. 5, 5a and 6, operation of inertia latch 60 is illustrated in detail. For the sake of simplicity, only sector gear 52 and latch member 62 are illustrated. Sector gear 52 includes a first aperture 82 for receiving pivot pin 16 as described hereinabove. The axis of rotation of sector gear 52 is designated $A_1$. A second aperture 84 is formed in sector gear 52 to receive pin 34 as described hereinabove. A plurality of gear teeth 86 are formed on an arcuate lower edge 87 of sector gear 52 spaced at a fixed radius from $A_1$ for engagement with fourth gear 51. An imaginary line designated as the design position line 88 extends upwardly and rightwardly from $A_1$ and will serve as a reference to describe the relative motion of upper recliner structure 12 and latch member 62 with respect to lower recliner structure 14 and sector gear 52. In seat design parlance, the design position line 88 extends upwardly through the seat back and is parallel to the spine line of a line interconnecting the H point and the shoulder point of a standardized front seat occupant.

Latch member 62 has an aperture 90 receiving pin 68. Latch member 62 is formed from a single stamped piece of metal and includes a cantilevered weighted portion 92 and a hook portion 94 which collectively establish a center of gravity (designated CG) which is located vertically intermediate the axis of rotation ($A_2$) of latch member 62 and $A_1$ as well as being horizontally intermediate $A_2$ and $A_1$.

The uppermost portion of sector gear 52 has a hammer head shape including a head portion 95 and a nose portion 96. A shank portion 97 as well as hook portion 94 of latch member 62 form a contoured surface 99 which engages a closely spaced surface 98 formed by head and nose portions 95 and 96, respectively of sector gear 52. A convex recess 100 is formed in head portion 95 which transitions at surface 98 to form a contact line 102.

Inertia latch 60 is illustrated in FIG. 5 in an orientation it would normally assume when a host vehicle is not subjected to acceleration forces and is sitting in a nominal horizontal position. Under such conditions, inertia latch 60 is definitionally in a "pre-latched position" in which hook portion 94 substantially encompasses nose portion 96 but is slightly spaced therefrom by a gap 103. As best viewed in FIG. 5a, sector gear 52 and latch member 62 establish contact between surfaces 98 and 99, respectively, when in the pre-latched position. Surfaces 98 and 99 are finished so as to have a predetermined range of coefficient of frictions whereby when inertia latch 60 is subjected to a relatively rapid rightward acceleration, surface 99 will slide leftwardly along surface 98 during an incipient displacement of upper recliner structure 12. Upon relatively small incipient displacement of about 3 degrees counter clockwise as illustrated by arrow 66 in FIG. 1, inertia latch 60 will transition from the pre-latched position illustrated in FIG. 5 to the fully latched position illustrated in FIG. 6 in which hook portion 94 fully engages nose portion 96 while, simultaneously, surface 99 is separated from surface 98 terminating the aforesaid surface contact. As illustrated in FIG. 6, inertia latch 60 is in the fully engaged position wherein upper recliner structure 12 is prevented from further forward displacement. When the period of the acceleration ceases, the upper recliner structure 12 and thus the latch member 62, will return to their positional orientation as illustrated in FIG. 5, i.e., the pre-latch position. Maintaining gap 103 at a relatively small dimension minimizes the amount of incipient displacement of upper recliner structure required to effect full engagement of inertia latch 60.

During normal operation in which the seat back is folded forward and then returned to its rest position, contact line 102 becomes important as follows. As the latch member 62 is rotated in a direction opposite to that of arrow 66, line contact is established between surface 99 and surface 98 at contact line or axial ridge 102. Just prior to reaching the pre-latched position shown in FIG. 5, the rolling line contact forces the weighted portion 92 of latch member 62 upwardly clockwise about $A_2$ which, in turn, forces hook portion 94 into its pre-latched position. Therefore, for an instant just prior to reaching the pre-latched position, there is a rolling contact about line 102 which serves to place the hook portion 94 into position.

Figures 7, 8:
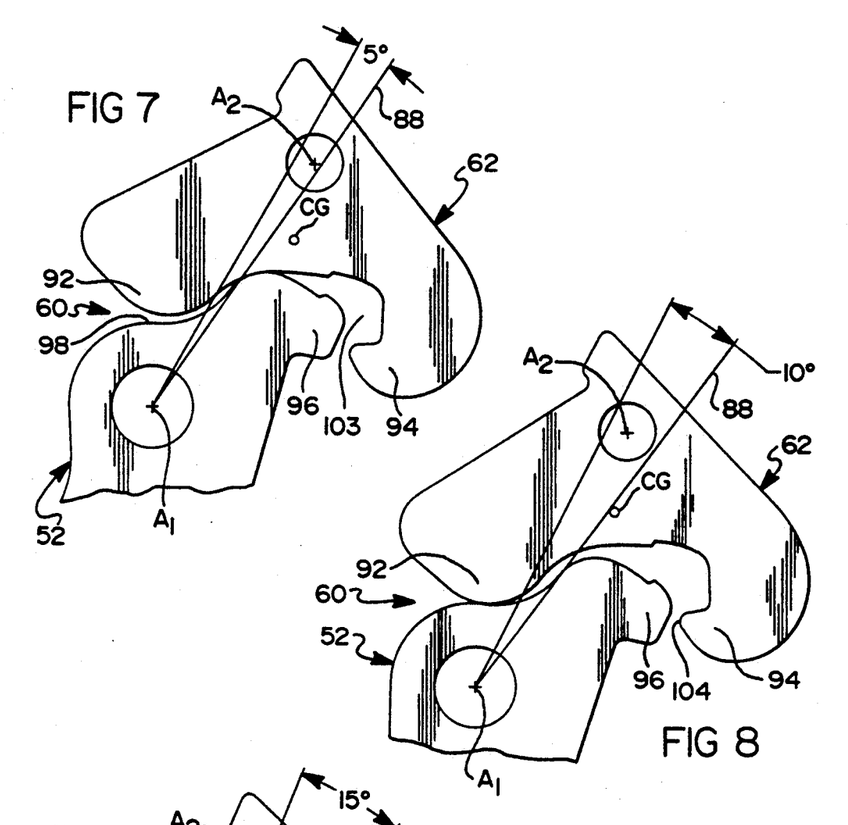
FIGS. 7-12, illustrate the positional interrelationships between the sector and inertia members of FIG. 5 on a further enlarged scale, in varying degrees of angular offset of the upper attachment member from an initial set position as illustrated in FIG. 1, illustrating the post-release motion of the latch.
Figure 9:
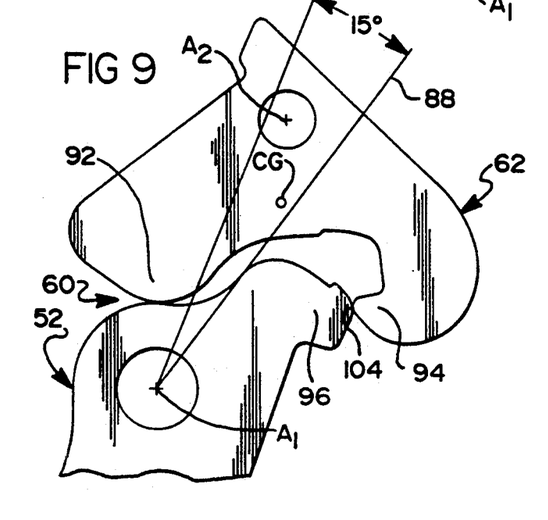
Figures 10, 11, 12:
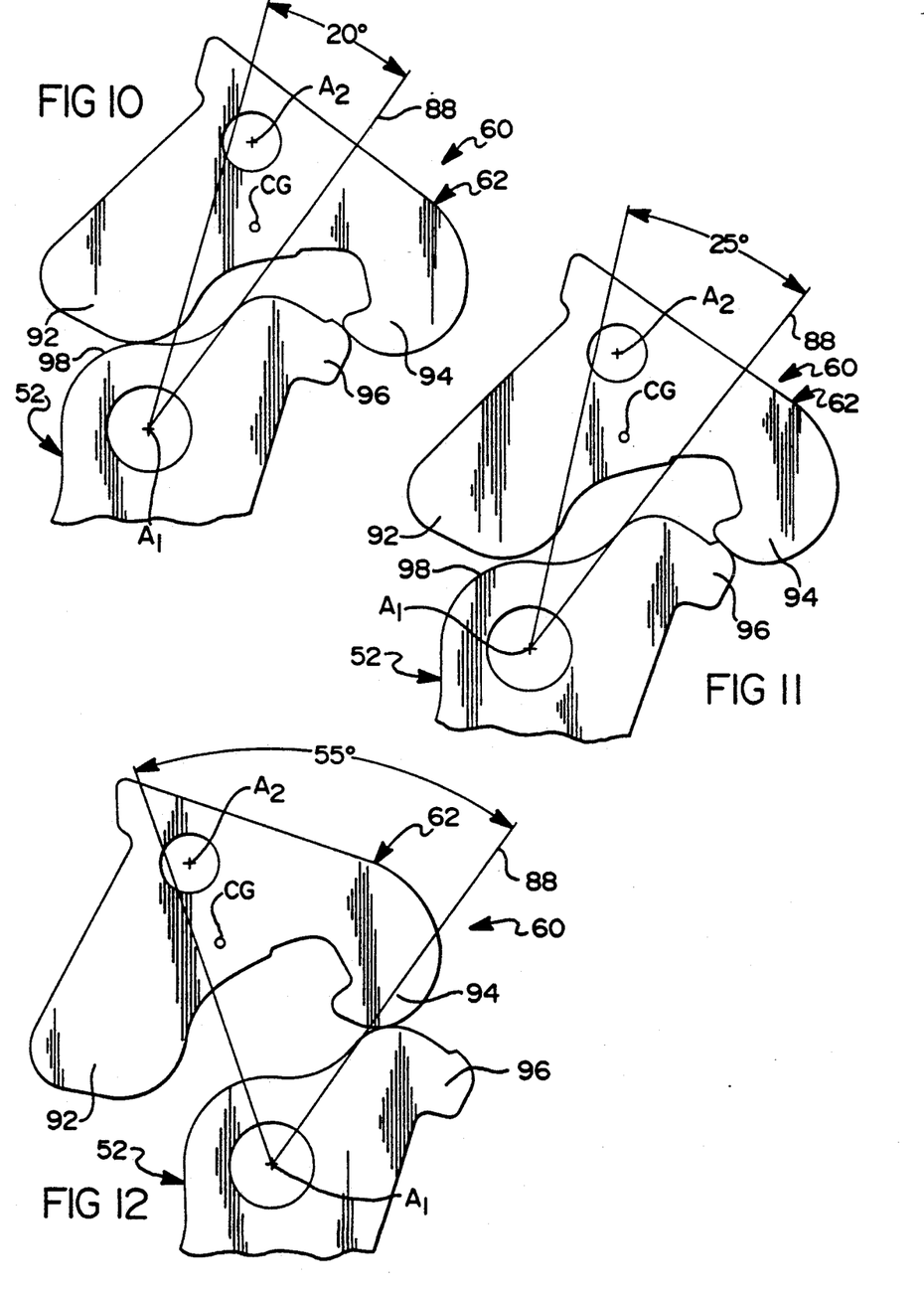

Referring to FIGS. 7 through 12, transition of inertia latch 60 from its pre-latch position of FIG. 5 to its fully unlatched position of FIGS. 7 through 12 upon the application of relatively low acceleration levels such as during manual displacement of the front seat back from the design position to the folded position is illustrated. Under such low acceleration conditions, rather than maintaining sliding point contact between surfaces 99 and 98, there will be a rolling type contact between contact line 102 and surface 99 during initial angular repositioning of upper recliner structure 12. During such rolling contact, latch member 62 will tend rotate counterclockwise with respect to sector gear 52 thereby increasing gap 103 wherein hook portion 94 rapidly de-encompasses nose portion 96 as illustrated in FIG. 7. After approximately five degrees of displacement, the inertia latch 60 is fully decoupled and the upper recliner structure 12 and associated seat back is free to be displaced forwardly to its fully folded position for rear seat vehicle entry or the like. Rolling contact between contact line 102 and surface 99 will continue until weighted portion 92 abuts surface 98 as illustrated in FIG. 8 at approximately 10 degrees of upper recliner structure rotation. Thereafter, sliding contact between weighted portion 92 upon surface 98 will continue until approximately 15 degrees of displacement has occurred as illustrated in FIG. 9 at which point a leading surface 104 of hook portion 94 contacts nose portion 96. Thereafter, the above described two sliding contact point engagement will be continued as illustrated in FIG. 10 until approximately 25 degrees of upper recliner structure displacement has occurred as illustrated in FIG. 11. At that time, contact between weighted portion 92 upon surface 98 will cease and thereafter single point sliding engagement between hook portion 94 and nose and head portions 96 and 95, respectively, will continue as upper recliner structure 12 is further displaced through its full 55 degrees of rotational freedom as illustrated in FIG. 12. As the seat back and upper recliner structure 12 is returned from a fully folded position to its set position, the engagement sequence described hereinabove is reversed until latch member 62 once again assumes its pre-latched position with respect to sector gear 52 as illustrated in FIG. 5.

During transition from the pre-latch position to the latched position, the center of gravity (CG) will remain vertically and horizontally intermediate axis $A_1$ and $A_2$. Having the CG so positioned allows the latch 60 to be position or attitude responsive as well as acceleration responsive. Inertia latch 60 will function as described herein above with the vehicle positioned on substantially any upslope or grade, which would result in a clockwise rotation of recliner mechanism 10 from the position illustrated in FIG. 1 (i.e. front of vehicle is to the left). Likewise, the latch 60 will operate as described to approximately a 15 degree downslope. For substantially greater than 15 degree downslopes, latch 60 will lock up under virtually all (de)acceleration levels. As will be apparent to one skilled in the art, placement of the CG of inertia member 62 as well as contours and coefficients of friction of surfaces 98 and 99 will alter the transition point between the two abovedescribed modes of operation of inertia latch 60.

It is to be understood that the invention has been described with reference to a specific embodiment to provide the features and advantages previously described and that the embodiment is susceptible of modification as will be apparent to those skilled in the art. For example, it is contemplated that changes to the coefficient of friction characteristic of surfaces 98 and 99 can be implemented to effect the transition point from sliding to rolling contact therebetween during operation of inertia latch 60. Furthermore, the weight distribution and particularly the displacement of center of gravity of latch member 62 with respect to $A_2$ can be varied to tailor the present invention for a specific application. Accordingly, the foregoing is to be construed in a limiting sense.

I claim:
1. A motor vehicle seat recliner comprising:
 a lower recliner structure for supporting a seat cushion;
 an upper recliner structure for supporting a seat back, said upper and lower structures joined at a hinge point;
 a sector member mounted to said lower recliner structure for limited rotation about an axis of said hinge point and defining a first abutment surface;
 adjuster means carried by said lower recliner structure and engaging said upper recliner structure for selective, substantially fixed angular positioning of said sector member to establish an upper recliner stop position;
 a latch member carried by said upper recliner structure for limited relative rotation about a second pivot axis offset from and generally parallel to said hinge point axis, said latch member defining a second abutment surface engageable with said first abutment surface to prevent forward rotation of said upper recliner structure as a function of recliner acceleration and attitude, said first and second abutment surfaces being in at least partial overlapping engagement during nominal rest conditions and relatively displaceable upon incipient movement of said sector member in a predetermined direction from a closely spaced pre-latched position to a widely spaced release position when said movement is at a relatively slow rate; and said sector member and said latch member including portions which are in sliding contact during incipient movement of said latch member from said pre-latched position to an abutting engaged position with said sector member when said movement is at a relatively high rate.

2. The seat recliner of claim 1, further comprising manual release means operable to displace said latch member to said release position independently of recliner attitude and acceleration.

3. The seat recliner of claim 1, wherein said latch member has a characteristic center of gravity offset from said second pivot axis.

4. The seat recliner of claim 1, wherein said latch member defines a tapered abutment surface engageable by a manual release actuator operable to displace said latch member to said release position independently of recliner attitude and acceleration.

5. The seat recliner of claim 1, wherein said sector member defines an arcuate toothed portion and said adjuster mechanism comprises an operator controlled electric motor drivingly engaging said toothed portion through a drivetrain.

6. The seat recliner of claim 1, wherein one of said portions which is in sliding contact defines a radially outwardly extending axial ridge operative to establish at least momentary line contact with said other surface portion during resetting movement of one of said members.

7. The seat recliner of claim 6 wherein portions which are in sliding contact have a predetermined characteristic coefficient of friction operative to effect continued sliding engagement as said latch member rotates from said pre-latch position to said release position, and is operative to effect sliding engagement as said latch member rotates from said pre-latch position to said engaged position.

8. The seat recliner of claim 1, wherein the latch member comprises:

a hook portion and a spaced counterweight portion, the second abutment surface formed on said hook portion, the portion of said latch member disposed in sliding contact with said sector member formed between said hook portion and said counterweight portion.

9. The seat recliner of claim 8, wherein the characteristic center of gravity of said latch member is offset from said second pivot axis of said latch member.

10. The seat recliner of claim 8, wherein said hook portion is closely spaced and non-engaged with said first abutment surface in a pre-latched position of said latch member.

11. A motor vehicle seat recliner comprising:

a lower recliner structure for supporting a seat cushion;

an upper recliner structure for supporting a seat back, said upper and lower structures joined at a hinge point;

a sector member mounted to said lower recliner structure for limited rotation about an axis of said hinge point and defining a first abutment surface;

adjuster means carried by said lower recliner structure and engaging said upper recliner structure for selective, substantially fixed angular positioning of said sector member to establish an upper recliner stop position;

a latch member carried by said upper recliner structure for limited relative rotation about a second pivot axis offset from and generally parallel to said hinge point axis, said latch member having a hook portion and a spaced counterweight portion, the characteristic center of gravity of said latch member being radially offset from said second pivot axis of said latch member, a second abutment surface formed on said hook portion engageable with said first abutment surface to prevent forward rotation of said upper recliner structure as a function of recliner acceleration and attitude, said first and second abutment surfaces being in at least partial overlapping engagement during nominal rest conditions and relatively displaceable upon incipient movement of said sector member in a predetermined direction from closely spaced pre-latched position to a widely spaced release position when said movement is at a relatively slow rate; and said sector member and said latch member including engagement surface portions which are in sliding contact during incipient movement of said latch member from a pre-latched portion to an abutting engaged position with said sector member when said movement is at a relatively high rate wherein said engagement surface portions have a predetermined characteristic coefficient of friction operative to effect rolling engagement as said latch member rotates from said pre-latch position to said release position, and are operative to effect sliding engagement as said latch member rotates from said pre-latch position to said engaged position, one of said engagement surface portions defining a radially outwardly extending axial ridge operative to establish at least momentary line contact with said other engagement surface portion during resetting movement of said latch member.

* * * * *